United States Patent [19]
Gonidec et al.

[11] Patent Number: 6,151,884
[45] Date of Patent: Nov. 28, 2000

[54] TURBOJET ENGINE THRUST REVERSER DOOR SPOILERS WITH MOTION CONTROLLING DRIVE SYSTEM

[75] Inventors: Patrick Gonidec, Montivilliers; Guy Bernard Vauchel, Le Havre, both of France

[73] Assignee: Hispano Suiza Aerostructures, France

[21] Appl. No.: 09/092,022

[22] Filed: Jun. 5, 1998

[30] Foreign Application Priority Data

Jun. 5, 1997 [FR] France .................................. 97 06942

[51] Int. Cl.[7] ........................................... F02K 3/02
[52] U.S. Cl. ...................... 60/226.2; 60/230; 244/110 B; 239/265.29; 239/265.31
[58] Field of Search .................................. 60/226.2, 230; 244/110 B; 239/265.19, 265.25, 265.27, 265.29, 265.31

[56] References Cited

U.S. PATENT DOCUMENTS

| | | |
|---|---|---|
| 3,601,992 | 8/1971 | Maison . |
| 4,463,903 | 8/1984 | Nightingale ........................ 239/265.25 |
| 4,894,985 | 1/1990 | Dubois et al. . |
| 5,003,770 | 4/1991 | Schegerin et al. . |
| 5,765,362 | 6/1998 | Gonidec et al. ........................ 60/226.2 |
| 5,893,265 | 4/1999 | Gonidec et al. ........................ 60/226.2 |
| 5,899,059 | 5/1999 | Gonidec et al. ........................ 60/226.2 |

FOREIGN PATENT DOCUMENTS

| | | |
|---|---|---|
| 1482538 | 5/1967 | France . |
| 2030034 | 10/1970 | France . |
| 2 618 853 | 2/1989 | France . |
| 0 771 945 A1 | 5/1997 | France . |

*Primary Examiner*—Ted Kim
*Attorney, Agent, or Firm*—Bacon & Thomas PLLC

[57] ABSTRACT

A bypass turbo-fan type turbojet-engine having a thrust reverser utilizing pivotally mounted bypass flow deflecting doors, each door having a movable, retractable spoiler at its upstream edge. A control actuator for driving each movable spoiler relative to a door is arranged to cause the spoiler to remain in a stowed retracted position during the initial motion of the door toward its open thrust reversed position and to begin to positively move the spoiler to its extended position into the deflected flow stream as the door nears its fully opened position, the spoiler being fully extended when the door is fully opened at its thrust reversed position.

5 Claims, 6 Drawing Sheets

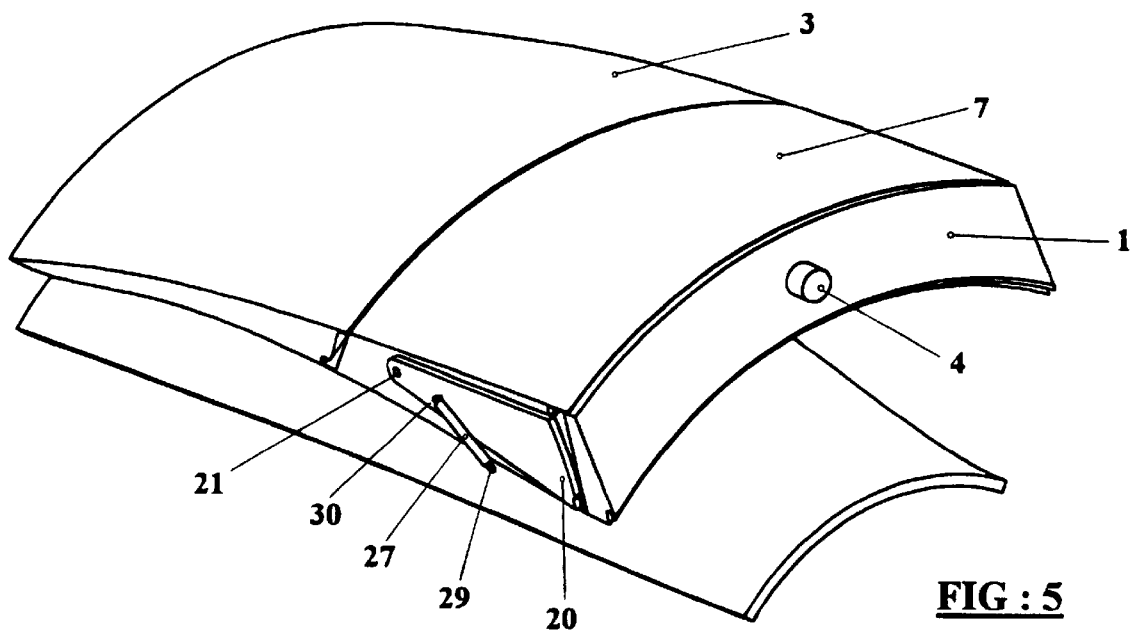
FIG : 5
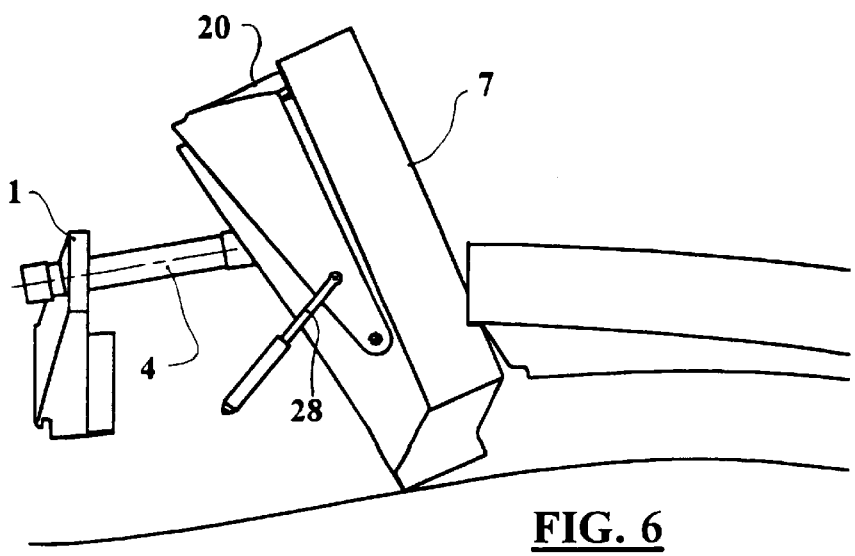
FIG. 6

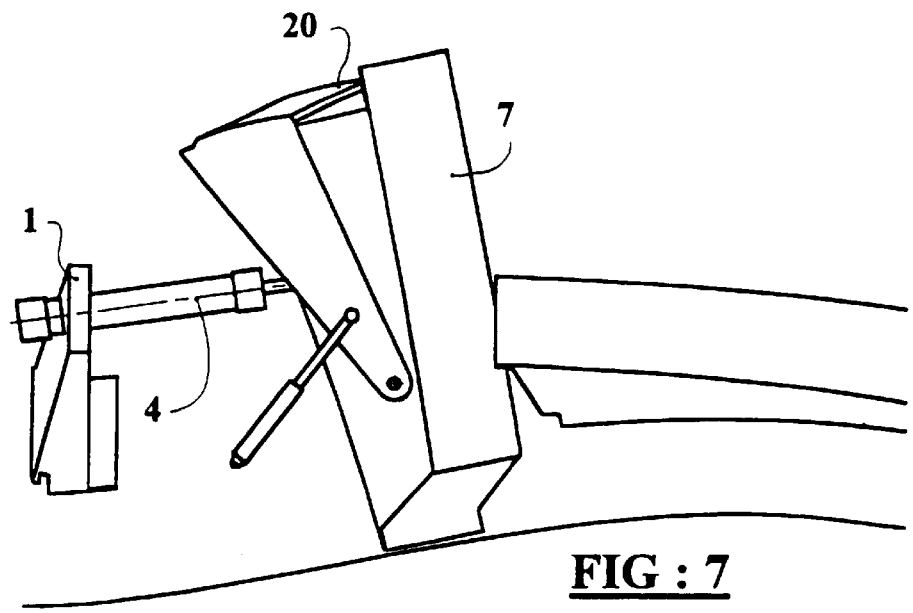
FIG : 7
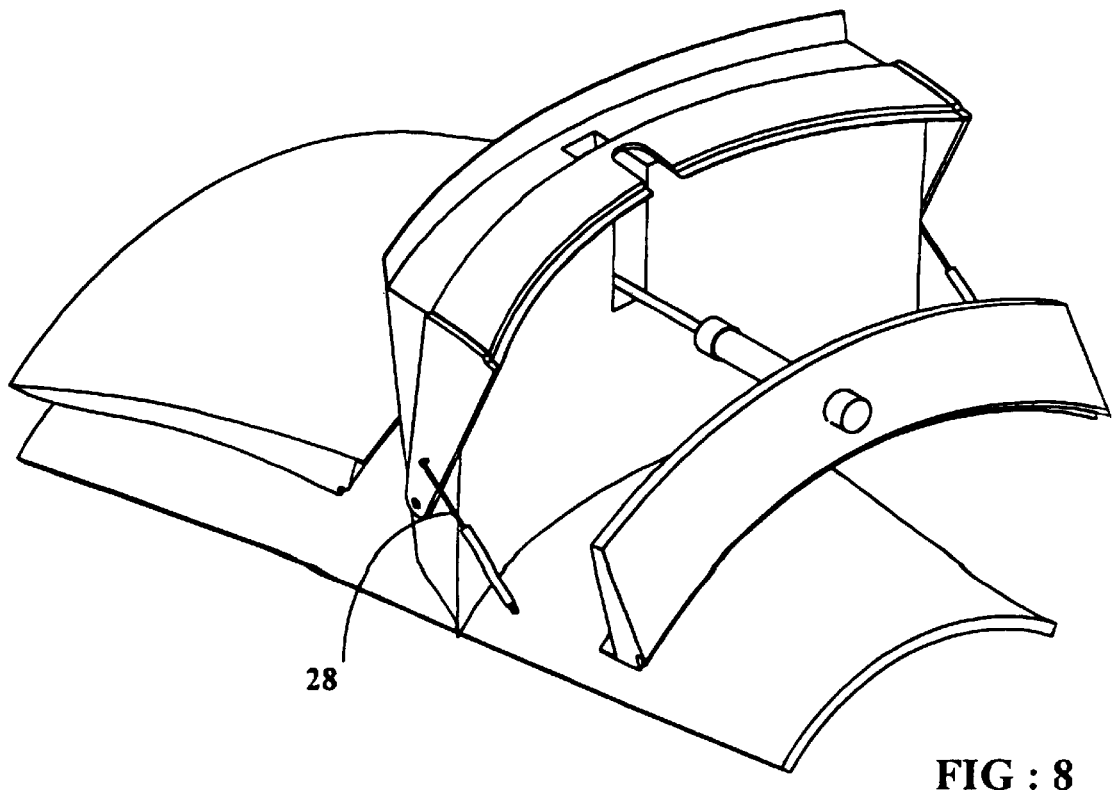
FIG : 8

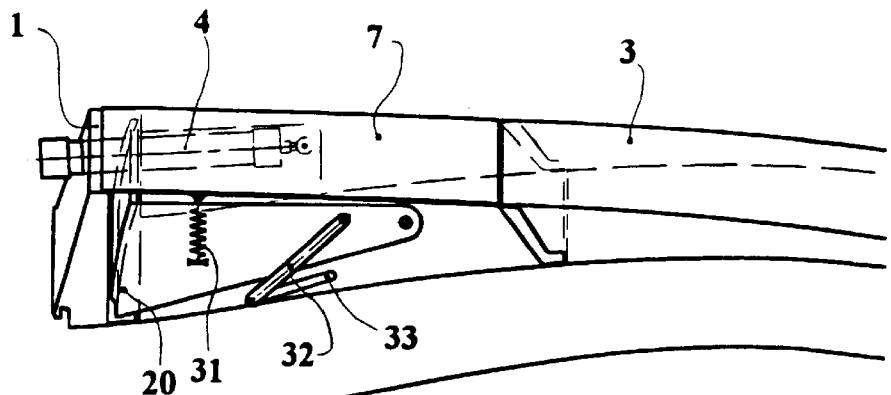
FIG : 9
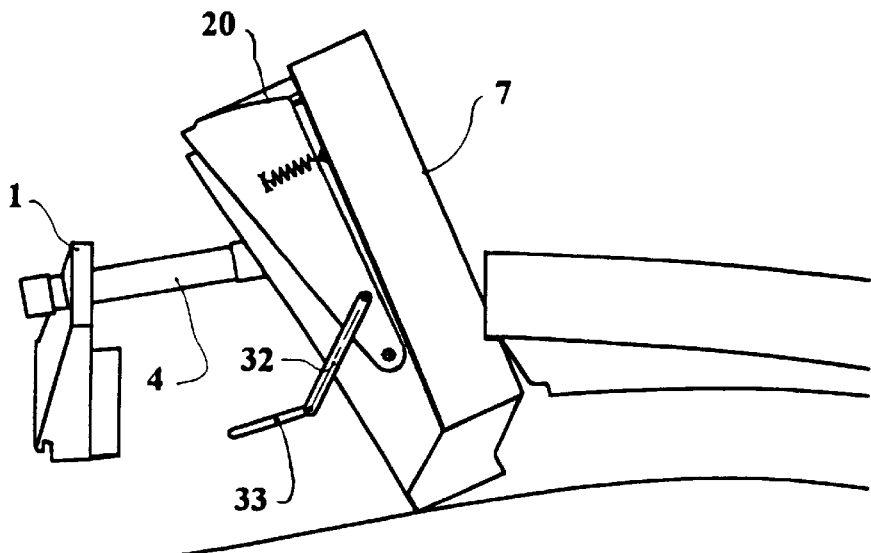
FIG : 10
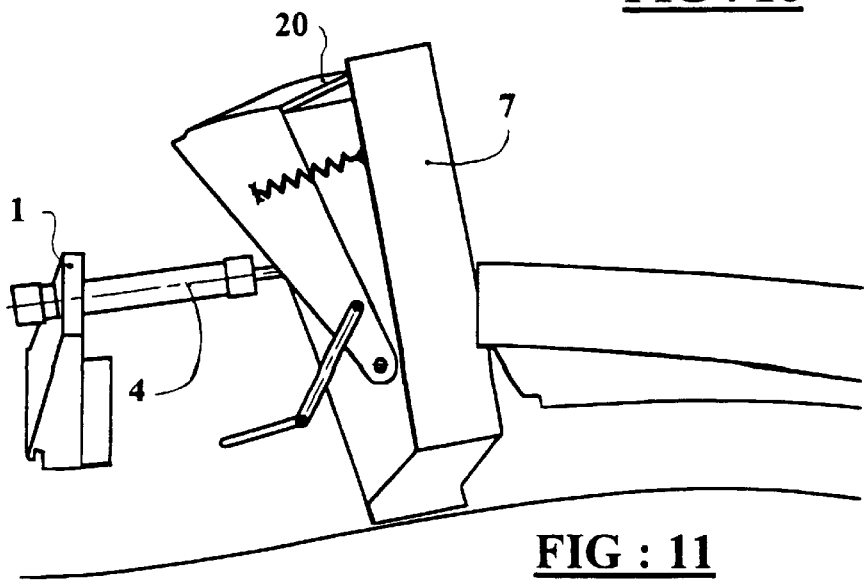
FIG : 11

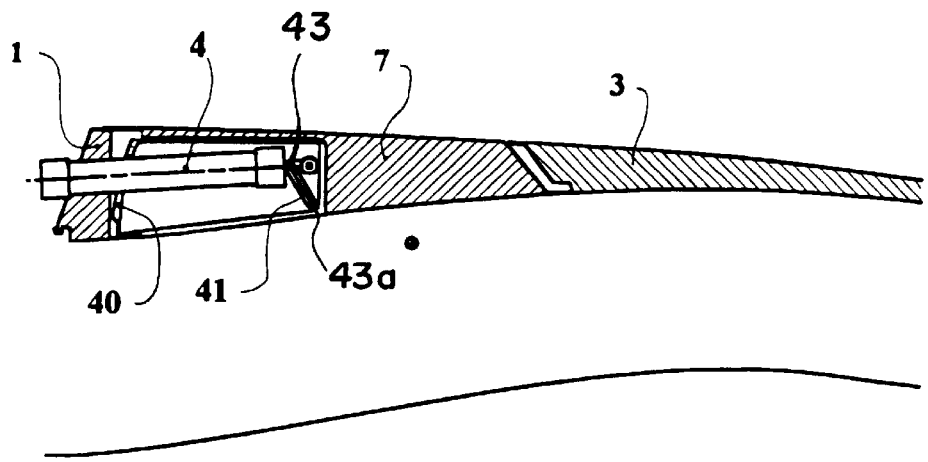
FIG : 12
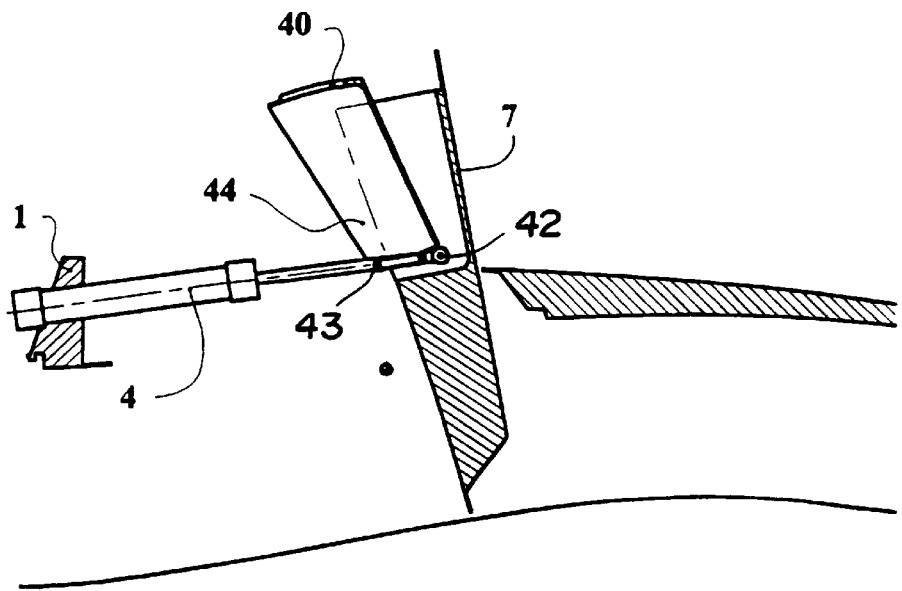
FIG : 13
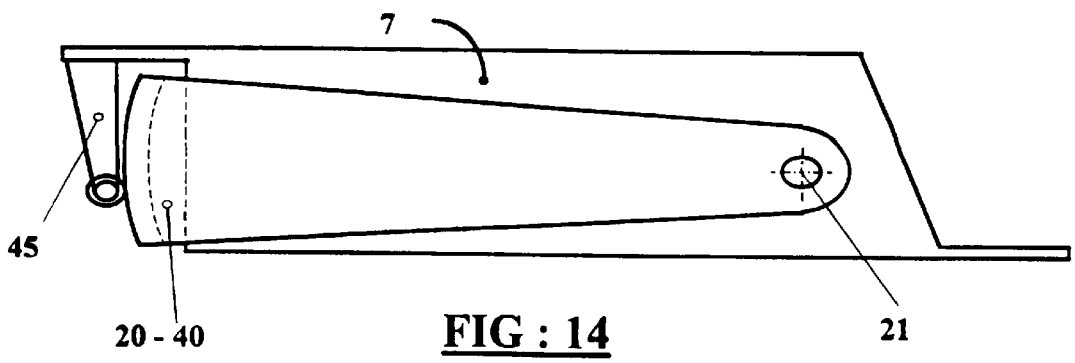
FIG : 14

TURBOJET ENGINE THRUST REVERSER DOOR SPOILERS WITH MOTION CONTROLLING DRIVE SYSTEM

BACKGROUND OF THE INVENTION

The present invention relates to a bypass turbo-fan type turbojet engine thrust reverser. In such engines, a duct is provided downstream of the fan to channel the so-called cold, bypass air exhausting from the fan. The duct consists of a fixed structure or fan nozzle having an inner surface which surrounds the engine proper and an outer wall, the upstream portion of which may be an extension of the surface of the portion of the cowling which surrounds the fan. The fan nozzle may channel both the bypass flow and the so-called hot, primary flow exhausting from the rear of the engine proper (in which case the hot and cold flows may be either mixed or confluent) or may channel only the bypass flow when so-called separate flows are involved.

The exterior of the casing surrounding the fan may be faired by an aerodynamically shaped wall minimizing powerplant drag as may the inner surface of this casing, the inner surface comprising the outer containment surface of the duct. This applies in particular to powerplants mounted on the outside of the aircraft, especially when these powerplants are attached under the wings or affixed to the rear of the fuselage.

Herein "external cowling" is intended to denote the assembly constituted by the exterior wall of the cowling of the powerplant.

FIG. 1 of the attached drawings shows a known embodiment of a thrust reverser of this type used in a bypass turbo-fan type turbojet engine while FIG. 2 shows a partial schematic perspective view of the same engine and thrust reverser installation.

The known thrust reverser is comprised of movable doors 7 which are part of the external cowling when they are in their inactive closed position during forward-thrust operation of the engine. Fixed upstream cowling portion 1 constitutes part of the external cowling which is upstream of the doors 7 and a downstream fixed cowling portion 3 is located downstream of the doors 7. Beams 18 located between the doors 7 connect the downstream external cowling portion 3 to the upstream external cowling portion 1. The doors 7 are mounted about the circumference of the external cowling and are pivotally mounted so that they may rotate about an axis located at an intermediate zone along or adjacent their side walls on the beams 18 which are adjacent to the side walls of these doors. The doors 7 are constructed so that the inner and outer surfaces of the doors are joined into a single unit by these side walls as well as by end walls located at the upstream and downstream ends of the doors. The outer surfaces of the doors constitute part of the outer cowling surface when the doors are closed, while the inner surfaces of the doors constitute part of the outermost surface of the duct wall, that is, an inner surface of the cowling.

The upstream portion 1 of the fixed cowling structure comprises a forward frame 6 which supports a control means which drives the doors 7 and which, by way of example, may be linear actuators 4.

Upon being driven open during transition to a reversed thrust position, the doors 7 pivot in such manner that the portion of each door which is downstream of its pivot axis is moved to more or less fully obstruct the duct while opening a passage to the exterior of the cowling and to deflect the bypass flow radially outward relative to the duct axis. In the open (thrust reversed position) the upstream portions of the doors 7 project outside the external cowling on account of constraints on the dimensions of these passages which must be designed and dimensioned to pass the flow without degrading engine performance. The excursion range of the doors is adjusted to allow passage of the cold bypass flow between the beams 18 and to suppress the forward thrust from this flow and to generate a counter-thrust produced by a redirection of this flow with an upstream flow component. The French patent documents 1,482,538 and A 2,030,034 describe such known embodiments.

Lastly, while the use of a linear actuator to drive the doors from one position to another is known, note should be taken of the very simple design whereby each door includes its own linear actuator affixed at its upstream end to the stationary upstream portion of the external cowling and at its downstream side to the upstream door portion in the manner described, for example, in French patent 1,482,538.

In general, the door 7 of this type of thrust reverser is complemented by a set of baffles which help channel the reverse flow when the thrust reverser is in the reverse thrust position and the door 7 is in the open, i.e., reverse thrust position. In particular, such a set of baffles may be represented by baffle 13 (FIG. 1) mounted on the upstream end of the door and consisting of a front portion which may or may not be provided with side parts. In order that the door 7 in its open, reversed thrust position will attain adequate performance, it is typically necessary, for instance in the known thrust reverser shown in FIG. 1, that the front portion of the inner panel 11 move away in a radially outward direction from a surface indicated by the line 14, which corresponds to a preferred boundary for the bypass flow as indicated by the arrow 15. A cavity 16 is defined on the duct side of the door 7 when the door is in the closed position corresponding to the forward thrust mode of operation. This cavity is bounded at the front by the door baffle 13 and by the flow deflecting edge 8 of the fixed upstream cowling portion 1, to the rear by the surface of the front portion of the inner panel 11; and by the inner surface of the door and the theoretical surface 14. In this arrangement, part of the flow in the duct is forced by the baffle edge 8 into said cavity 16, resulting in flow distortion or turbulence and aerodynamic losses which degrade forward thrust operation.

The French patent document A 2,618,853 solves this problem by canceling or minimizing the cavity 16 in the door 7. A moveable and retractable door lip or spoiler is driven by the door actuator into a position such that the door end projects beyond the spoiler to obtain maximum performance during forward thrust operation.

This system cooperates with the rod of the linear actuator to drive the doors 7 or with an automatic spoiler drive means. At the first motion of the doors during opening of the doors, the spoiler moves out of the door end either progressively, such as when the spoiler is driven by the said actuator, or fully when the spoiler is automatically driven by a spring system.

This design suffers a major drawback in that part of the cross-section of the thrust-reversal flow is masked during the initial opening of the door, whereby engine performance may be degraded during the intermediate thrust-reversal phase.

SUMMARY OF THE INVENTION

An object of the present invention is to provide a pivoting door thrust reverser for a turbo-fan type turbojet engine of the type described above wherein a drive means for the door lip or spoiler controls the spoiler motion relative to the door so that the spoiler remains in the retracted or undeployed position during the first opening movement of the door and moves to the deployed position only during or at the final motion of the door.

Preferably, the drive means for moving the spoiler relative to the door comprises a linear actuator or a link connected to the fixed thrust-reverser structure. This drive means for the movable spoiler also may be combined with the linear actuator driving the thrust reverser doors.

Another object is to provide a thrust reverser wherein operation of the associated turbojet engine is optimized during the transition between forward thrust and reversed thrust operation by using non-cavity type doors combined with a movable spoiler having a motion control arrangement.

Other features and advantages of the invention are elucidated in the following description of the embodiments of the invention and in relation to the attached drawings.

BRIEF DESCRIPTION OF THE DRAWINGS

FIG. 5 is a schematic front perspective view of the thrust reverser of FIG. 4;

FIG. 6 shows the embodiment of FIG. 4 with the various elements positioned in transition between forward thrust and reversed thrust operation;

FIG. 7 shows the embodiment of FIG. 4 when in the reversed thrust mode;

FIG. 8 is a schematic front perspective of the thrust reverser shown in FIG. 7;

FIGS. 9, 10, 11 show another embodiment of the invention in the same configurations as shown in FIGS. 4 through 8;

FIGS. 12, 13 show a combined drive means for the spoiler and the door; and

FIG. 14 shows a guide system for the spoiler.

DETAILED DESCRIPTION OF THE PREFERRED EMBODIMENTS OF THE INVENTION

Figure 1:
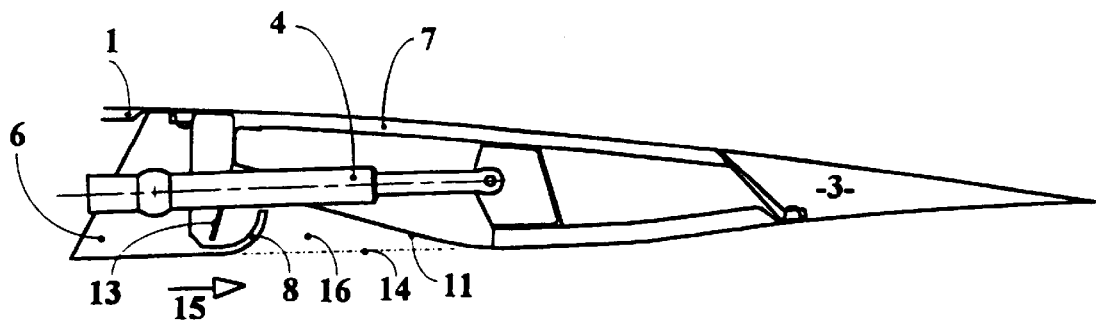
FIG. 1 is a schematic side elevation longitudinal section view in a plane including the axis of rotation of a portion of an associated turbojet-engine of a thrust reverser fitted with pivoting known type thrust reverser doors, shown in their closed position.
Figure 2:
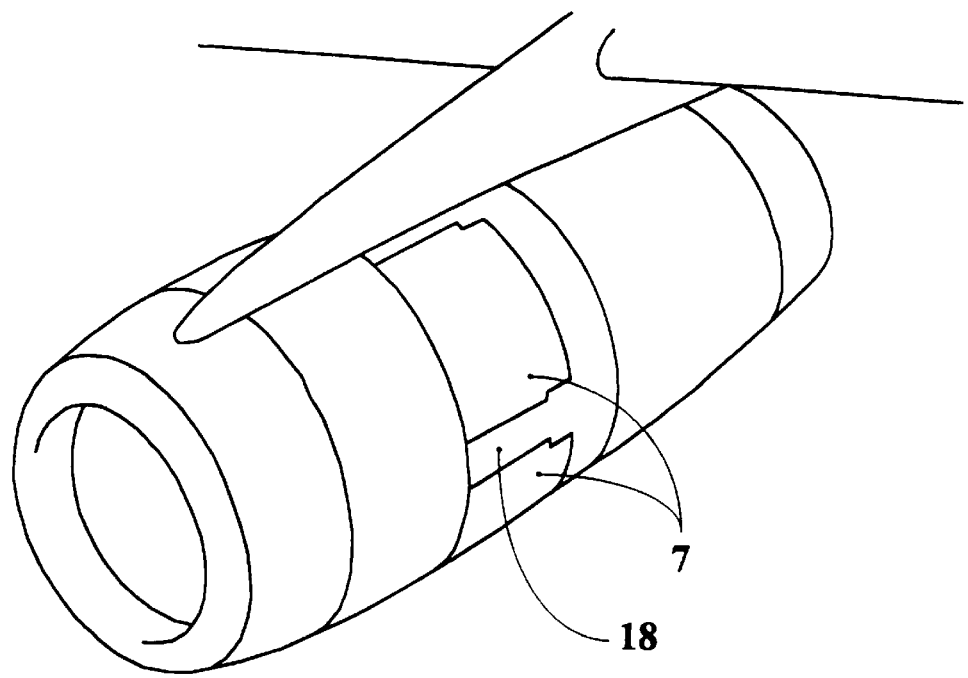
FIG. 2 is a schematic perspective of an engine cowling including a thrust reverser of the type shown in FIG. 1 with the cowling surrounding the engine core of a turbo-fan type turbo-jet engine and with the doors in their closed, forward thrust position.
Figure 3:
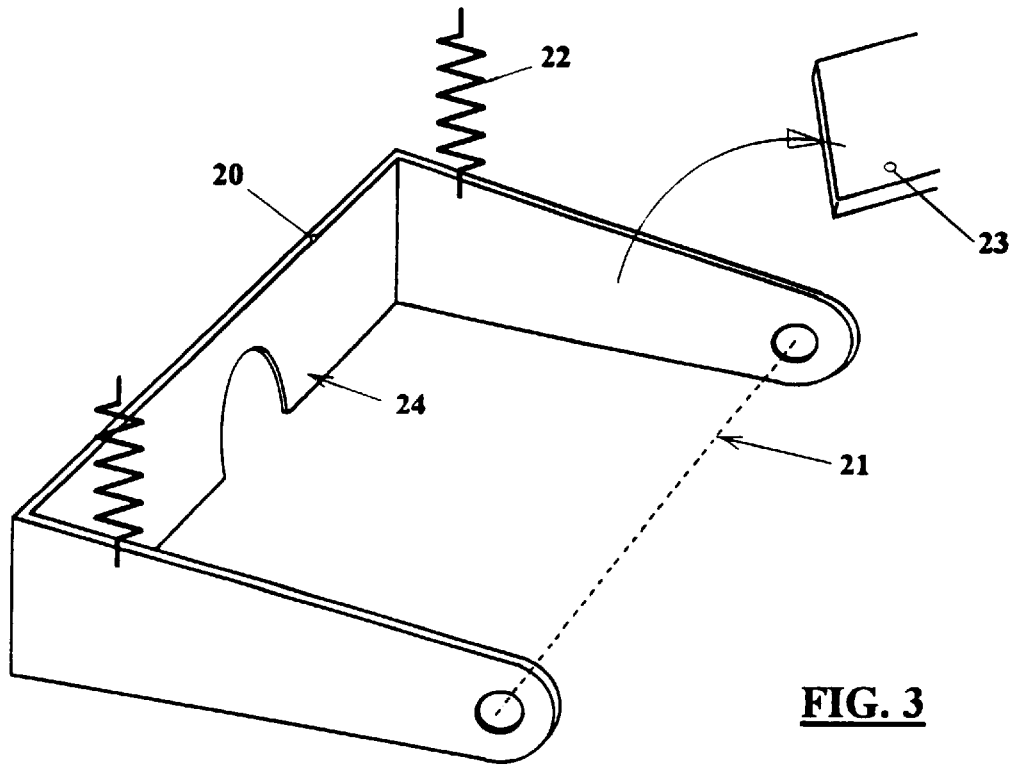
FIG. 3 shows elements of one embodiment of the present invention including a door spoiler.
Figure 4:
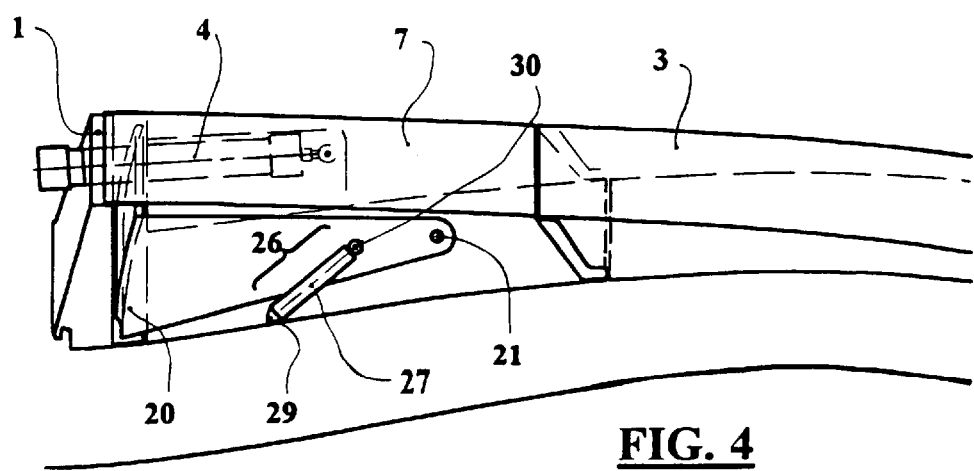
FIG. 4 is a view similar to FIG. 1 of an engine and thrust reverser including an embodiment of the present invention with the various elements positioned for forward thrust operation.

FIG. 3 shows a detail of the movable door lip or spoiler 20 according to this invention mounted for pivotal motion about an axis 21. One or more known type automatic drive means, here shown in the form of tension springs 22 which each extend between the spoiler 20 and the door 7 on which the spoiler is mounted, keep the spoiler fixed in position relative to a door 7 on which the spoiler is mounted until an overriding force causes the spring to extend. This overriding force appears upon contact between the spoiler 20 and a fixed stop 23 rigidly joined to the fixed thrust reverser portion 1 when door 7 moves toward an open, thrust reversed position. This stop prevents further motion of the spoiler at a defined angular position while the door 7 continues its rotation until the door 7 reaches its final open or thrust reversed position. The differential so created between the two rotations allows the lower portion 24 of the spoiler 20 to fully project beyond the inside surface of the door 7 only when the door is in the reversed thrust position.

A more detailed illustration is shown in FIGS. 4 through 8. The movable spoiler 20 comprises a front portion near the upstream edge of the thrust reverser door 7 and two side parts extending downstream to supporting pivot 21. This pivot 21 may be coaxial with the pivot of the door 7 or it may be offset from it, the position of the pivot 21 of the spoiler 20 being selected to provide optimal thrust reverser performance. One or more linear actuators 26 extend between and are pivotally connected to pivot 29 affixed to the fixed thrust reverser structure and pivot joint 30 on the spoiler 20. These actuators may be of the piston-in-cylinder type wherein a piston slides within a cylinder to cause motion of drive rod 28.

In this embodiment, a spring inside the body 27 drives the spoiler 20. Said spring furthermore can be mounted outside the body 27 associated with said actuator or at any other location between the spoiler 20 and the door 7.

The movable door spoiler 20 remains retracted away from the inner surface of the door 7 (towards the outer surface) during the initial motion of the door toward its opened position, the rotation of the spoiler 20 being stopped by an excursion limit means for the piston of the linear actuator 26 which, for purposes of illustration, may be located inside the body 27.

The location of the drive system 26 for the spoiler 20 is selected to obtain optimal kinematics and may be either at the side or at the front of the spoiler 20.

FIGS. 9 through 11 show another embodiment of the invention. The spoiler 20 is connected to the door 7 by an elastic spring connection 31 that holds the spoiler retracted upon first motion of door 7, in the manner discussed above in relation to FIG. 3. In the embodiment of FIGS. 9 through 11, a linkage rod 32 extends between a pivot connection on the spoiler 20 and a sliding and pivoting connection at a motion control slot 33 in the fixed structure of the thrust reverser 1 and serves to prevent co-rotation of the spoiler 20 with the door 7 beyond a selected degree of opening of the door. The downstream end of the slot 33 is shown as constituting the translational stop of the end of rod 32 connected to the slot. It will be noted that one linkage rod 32 may be used per spoiler or per spoiler side. Any other functionally equivalent system also may be used.

The slot 33 may follow any motion control path, namely rectilinear, curved or other, and it may be horizontal, slanting and even be a combination of several of these configurations.

FIGS. 12 and 13 show another embodiment of the invention whereby a door spoiler 40 is driven by the linear actuator 4 of the door 7. The spoiler 40 comprises a downstream extending side structure 44 which covers the linear actuator 4 when the door is in the forward thrust position and preferably is received in a cutout in the forward end of the door 7 to allow the actuator 4 to be contained within the surfaces of the thrust reverser. Furthermore, the structure 44 of the spoiler 40 may be integrated with the door or extend along the sides of the door. On one hand, this structure 44 allows rigidifying the upstream side of the spoiler when in the reversed thrust mode of operation and on the other hand it provides a linkage connecting point 42 so that the actuator 4 can drive the spoiler. A pivot 43 is located at a selected location along the displaceable component of the actuator 4 of the door 7 and is connected by means of one or more linkage rods 41 connecting structure 44 of the spoiler 40 at one or more points 43a in such a manner that the actuation by the linkage rod 41 generates an angular differential between the positions of the spoiler 40 in the forward and the reverse thrust modes relative to the door 7. This design feature allows achievement of an appropriately projecting spoiler position relative to the position of door 7 when the latter is in the open thrust reversed position as shown in FIG. 13.

It is clear that, depending on need, all the above design principles are applicable to doors having open cavities as well as closed inner surfaces.

In FIG. 14, one or more external guide systems 45 are provided to allow reduction or elimination of bending of the spoiler 40 during the thrust-reversal phase. Such guide system may be combined with the door 7, and cooperate with the upstream or lateral structure of spoiler 20 or 40 by friction, rolling or in any other manner.

Various modifications to the structure of the preferred embodiments to achieve the same function can be made by the person skilled in the art without departing from the scope of the invention defined by the following claims.

What is claimed is:

1. In a bypass turbofan turbojet engine thrust reverser including pivoting doors which in their closed position during forward thrust operation conform with an outer wall of a flow duct at the rear of the turbofan and which when pivoted by actuators constitute flow-deflecting baffles during reversed thrust operation; fixed longitudinal beam elements separating the doors circumferentially, each door including at its upstream end, a door spoiler movably attached to the door; and a spoiler movement control device arranged such that, in the closed position of the door, the spoiler is retracted and in the fully open position of the door during the thrust reversed mode, the spoiler is moved relative to the door and projected into the deflected flow stream from the upstream end of the door, the improvement comprising:

said spoiler movement control device including at least one actuator element arranged so as to control the motion of the movable spoiler relative to the upstream end of the door while the door is moved towards its open position so that the spoiler maintains an inactive retracted position during a first opening phase of the door motion and so that upon the door approaching its end of travel towards a thrust reversed position, the spoiler is driven to an extended position into the deflected flow stream.

2. The improvement according to claim 1, wherein each movable spoiler comprises a front part located adjacent an upstream end of a respective door and two side parts extending downstream of the front part and hinged on a pivot device connected to the door; said spoiler being linked to the fixed thrust reverser structure by at least one linear actuator mounted between a fixed point connected to the fixed structure and the spoiler; a motion stop element limiting travel of one part of the actuator for causing the spoiler to be extended by the door at the end of the opening motion of the door; and an elastic spring connected between the door and the spoiler holding the spoiler at a retracted position during the first opening motion of the door.

3. The improvement according to claim 1, wherein each spoiler comprises a front part located near the upstream end of a respective door and two rearwardly extending side parts hinged at a downstream location on a pivot connected to the door, said spoiler being connected to the fixed thrust reverser structure by at least one linkage rod having one end slidably engaged in a motion control slot located on fixed structure such that during the first opening phase of the door, the spoiler follows the motion of the door; an elastic spring between the spoiler and a respective door resiliently holding the spoiler at its retracted position relative to the door during the initial opening motion of the door, said linkage rod extending the spoiler about said pivot by its cooperation with the motion control slot as the door reaches its reverse thrust position.

4. The improvement according to claim 1, including a linear actuator having an extendable actuating rod for driving each door to a thrust reversed position and wherein each movable spoiler comprises an enclosing structure which, in the forward thrust mode, is located in a housing provided within the upstream end of a respective door and receives within the enclosing structure at least part of the linear actuator driving the door; said enclosing structure covering a portion of said actuator when the door is closed; and at least one linkage rod extending between a pivot location on said enclosing structure of the spoiler and a pivot location on the rod of the actuator, the length of the linkage rod and the respective position of its ends being selected as a function of the displacement of the rod of the actuator driving the door such that the spoiler is held retracted as the door is driven towards its thrust reversed position until the door approaches the end of its travel at its thrust reversed position and then is extended by the linkage rod and the motion of the door.

5. The improvment according to claim 1, including a guide rigidly affixed to each door adjacent the respective spoiler, said guide providing support for the spoiler when it is extended into the deflected flow stream in order to limit bending of the spoiler in the thrust reversed position.

* * * * *